Oct. 16, 1945.  W. W. BENTLEY, JR  2,386,777
ACCELEROMETER
Filed April 8, 1942  2 Sheets-Sheet 1

INVENTOR
WILLIAM W. BENTLEY, JR.
BY
ATTORNEYS

Oct. 16, 1945.   W. W. BENTLEY, JR   2,386,777
ACCELEROMETER
Filed April 8, 1942   2 Sheets-Sheet 2

INVENTOR
WILLIAM W. BENTLEY, JR.
ATTORNEYS

Patented Oct. 16, 1945

2,386,777

UNITED STATES PATENT OFFICE 2,386,777

ACCELEROMETER

William W. Bentley, Jr., New Carlisle, Ohio

Application April 8, 1942, Serial No. 438,098

2 Claims. (Cl. 177—311)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to acceleration measuring instruments and, in particular, to devices for measuring acceleration in vertical directions.

When an airplane is in flight, the lifting forces which hold the plane suspended in the air on a certain level equal the weight of the plane. When it is intended to lift the plane from the said level to another level, an additional lifting force is required so that the total force acting upon the plane during this lifting action or change in altitude is now greater than the weight of the airplane. This total force is equal to the product of the mass of the plane times the acceleration of the plane. Inasmuch as the mass may be expressed by $$\frac{\text{Weight}}{\text{Gravity}} = \frac{W}{g}$$

the said total force, F, may be expressed by the formula $$F = \frac{W}{g} \times a$$

wherein $a$ is the vertical acceleration of the plane. Since, furthermore, the acceleration $a$ may be expressed as $g \times n$, wherein $n$ is a factor, the above formula for the total lifting force may be written as $$F = \frac{W}{g} \times g \times n = W \times n$$

In the above formula W, which, as mentioned above, represents the weight of the plane, is constant, so that F can be determined by measuring the factor $n$.

The aircraft industry has tried to develop measuring instruments, for measuring said factor $n$, which instruments are commonly known as accelerometers, and employed for use in connection with the testing of airplanes.

One of these instruments, known under the name "Weaver accelerometer" employs a plurality of plungers each of which rests upon a differently calibrated spring and tends to compress the respective spring by its own weight. To effect a measuring operation, the instrument is mounted in the plane to be tested so that variations in the vertical acceleration of the plane react upon the instrument plungers thereby causing the latter to vary the compression of the spring pertaining thereto. Since the calibration of each spring corresponds to a different value of $n$, that spring which prevents a predetermined movement of the plunger pertaining thereto indicates the respective $n$ of the plane under test.

In order to facilitate the movement of the plungers in the said Weaver device, an arrangement was provided known under the name "De Port accelerometer" according to which the plungers were suspended on tension springs rather than to have them rest on compression springs.

However, these known devices have the great disadvantage that they can be used for drop tests only, i. e. when the measuring plunger at the time of measurement is in a vertical position. A further drawback of these known devices consists in the relatively high friction between the plungers and the guiding means therefor. It may also be mentioned that it is impossible to properly align the plungers and their coil springs and to maintain them in this alignment.

These known devices have also the very important disadvantage that a recording disc is required for registering a measurement, which recording disc has to be replaced by another one for subsequent measurements; in other words, it is not possible to make continuous measurements and/or recordings of the changes in acceleration as they appear with the airplane in flight. Also calibrated springs, as used in the above mentioned known instruments, are not reliable since they lose their elastic properties.

It is, therefore, an object of my invention to provide a measuring instrument which, although simple in construction, will overcome the above mentioned drawbacks.

Another object of my invention consists in the provision of an accelerometer which will yield more accurate readings than heretofore possible.

It is a further object of my invention to provide an instrument for measuring the acceleration of an airplane while the latter is in flight.

It is another object to provide an accelerometer which, when used in connection with an aircraft, will allow continuous recordings of the acceleration or changes in acceleration as they occur during the operation of the aircraft.

It is still another object to provide an accelerometer which will, instantaneously, produce a visual indication of acceleration or changes in acceleration whenever they occur.

These, and other objects and advantages will appear more clearly from the following specification in connection with the accompanying drawings, in which:

Figure 1 diagrammatically illustrates the principle of the invention.

*Principle of the invention*

It is well known that a liquid in a more or less U-shaped tube, open at both ends, will always assume a position in which the level of the liquid in both arms of the tube will be equal. This is due to the fact that the liquid in each arm is subjected to the same pressure. However, if the pressure acting upon the liquid in one arm in changed, with regard to the pressure acting upon the liquid in the other arm, the above mentioned condition of equilibrium is disturbed so that the liquid in one arm will be at a higher level than the liquid in the other arm. Assuming now that the pressure acting upon the liquid in both arms is again equalized, the liquid will return to its previous position in which the levels of the liquid were the same in both arms. Since the pressure acting upon the liquid in both arms was assumed to be equal, it is obvious that the restoring force for returning the liquid to its previous position must be the weight of the liquid column which is defined by the difference in level of the liquid in both arms. In other words, the said liquid column constitutes a source of potential energy tending to change the levels of the liquid in the two arms and this change can be brought about by subjecting the said liquid column to an unbalanced force. This principle has been made use of in the accelerometer of the invention.

Figure 1:
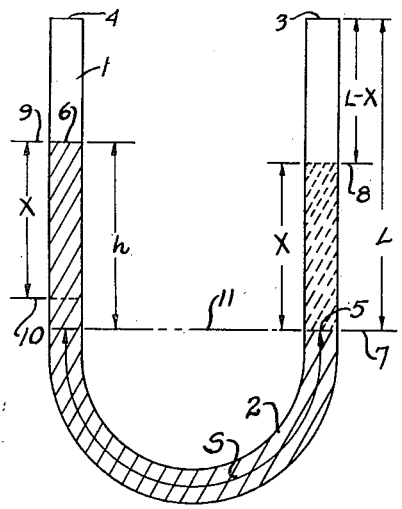

Referring to Figure 1, the same shows a U-shaped tube 1 which contains a liquid 2 of a known density $r$. In the particular instance, illustrated in Figure 1, the liquid in the arm 3 is at a lower level than the liquid in the arm 4. This is due to the fact that the pressure acting upon the surface 5 of the liquid in arm 3 is higher than the pressure acting upon the surface 6 of the liquid in arm 4. The height of the column, which column is defined by the difference in level of the liquid in both arms 3 and 4, is called the head $h$. The pressure acting upon the surface 5 is equal to the pressure on the surface 6 plus the pressure exerted by the said column. The weight of the said column per unit of cross-sectional area can be expressed as $h \times r \times l$. Designating the pressure on surface 6 as $p_0$ and the pressure acting on surfaces 5 as $p_1$, it will be clear from the foregoing that $p_1 = p_0 + h \times r$.

Assuming now that the above mentioned liquid column is acted upon by an unbalanced force such as would be produced by acceleration, while arm 3 is sealed and arm 4 is open, the liquid in arm 3 will move up from the level 7 to the level 8, whereas the liquid in arm 4 drops from the level 9 to 10. The difference between the levels 7 and 8 equals the difference between levels 9 and 10 and this difference is designated X. In other words, liquid 2 has shifted in the tube 1 through a distance X, and in so doing has reduced the head $h$ in arm 4 and raised the level in arm 3, therefore, causing an increase in the pressure of the air in arm 3. Therefore, the liquid level reached in arm 3 above position 7 is a measure of the force exerted on head $h$, and thereby makes possible the determination of the acceleration to which said liquid column was subjected.

Mathematically, the above mentioned unbalanced force produced by accelerating the liquid 2 in tube 1 may be expressed as $F = ma$, wherein $m$ = mass of liquid 2
$a$ = acceleration with which liquid 2 moved and since $a = n \times g$ where $n$ is a multiple factor; $g$ is the acceleration of gravity, the unbalanced force may be expressed as $F = m \times n \times g$. Inasmuch as $$m = \frac{W}{g}$$

wherein

W = weight of liquid 2, the unbalanced force may be expressed as $F = W \times n$. The weight of liquid 2 may be expressed as $W = (S+h)Ar$, wherein S designates the length of the centerline of the tube 1 extending from level 7 to line 11, and
A = cross-section area of liquid 2.

Designating the distance between the sealed end of the tube arm 3 and the liquid level 7 as L, the unbalanced force may be expressed as:

$$F = A(h-X)rn - AXrn - P_1\left(\frac{L}{L-X}\right)^K A = (S+h)Arn$$

wherein

K = Ratio of specific heats for constant pressure and constant volume (for gases).

or $$(h-X)rn - Xrn - (S+h)rn = p_1\left(\frac{L}{L-X}\right)^K$$

and $$-n = p_1\left(\frac{L}{L-X}\right)^K \cdot \left(\frac{1}{r(2X+S)}\right) = p_1\left(\frac{V}{V_1}\right)^K \cdot \left(\frac{1}{r(2X+S)}\right)$$

wherein

V is the original volume of gas between the sealed end of arm 3 and level 7.
$V_1$ is the volume of gas between the sealed end of arm 3 and level 8.

Figure 2:
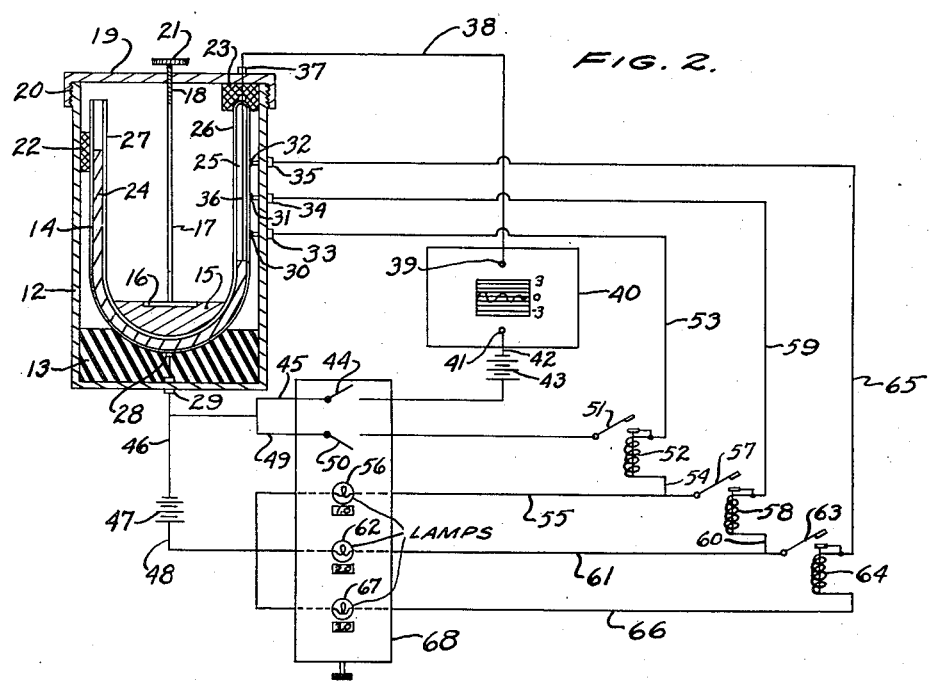
Figure 2 is a diagrammatic illustration of a first embodiment of the invention.

Referring now to a practical embodiment of the invention, and to Figure 2 in particular, the device shown therein comprises a casing 12 having mounted therein a support 13 of any desired material, preferably rubber. Carried by the support 13 is a U-shaped tube 14, made of some material that is a non-conductor of electric current, and which is pressed against the support 13 by a pad 15. The pad 15 is pressed against the tube 14 by means of a bearing plate 16 and a rod 17 having a threaded upper portion 18. The threaded portion 18 passes through and threadedly engages a cover 19 which closes the casing 12 and may be connected thereto in any desired manner, preferably by means of a thread 20. The upper portion of the rod 17 has rigidly connected thereto a knurled knob 21 for actuating the rod 17 so as to press the same against the bearing plate 16 or to space it therefrom. The tube 14 is furthermore held in the casing 12 by means of a lateral support 22 and a further support 23.

The tube 14 contains a liquid 24, preferably mercury, and is closed at one end. Provision is made that a differential pressure acts upon the liquid 24. For instance, in the specific embodiment shown in Figure 2, a gas 25 at a predetermined pressure, is confined in the upper portion of the closed right-hand arm 26 of the tube 14, whereas, the left-hand arm 27 of the tube 14 is open to atmospheric pressure. Due to the thus established differential pressure, the liquid 24 will stand at a higher level in arm 27 than in arm 26. Arranged in the tube 14, preferably at the lowest portion thereof, is a contact 28 which is connected to a terminal 29 on the outside of the casing 12. Similar contacts 30, 31, and 32 are provided in the arm 26 which are respectively connected with terminals 33, 34, and 35, likewise on the outside of the casing 12. The contacts 30, 31, and 32 are spaced from each other in accordance with the desired range and degree of sensitivity of the instrument. While, in the embodiment of Figure 2, only three contacts are shown in arm 26, it is, of course, understood that the number of contacts may be varied in accordance with the desired range and accuracy. It should, likewise, be pointed out that, for this particular arrangement only, (i. e. when the material of tube 14 is a non-conductor) the contacts do not have to be insulated from the tube. If it should be decided advantageous to use an electric-current-conducting material, such as copper, for tube 14, the contacts can easily be insulated from the tube, and consequently, preserve the utility of the indicating means.

As will be seen from Figure 2, the instrument shown therein comprises a conductor 36, such as a wire, which extends into the arm 26, preferably so that it will at all times be contacted by the liquid 24. However, it is to be understood that this is by no means a requirement, since the extent to which the wire is contacted by the liquid 24 merely depends on the desired measurement to be effected. The wire 36 leads to a terminal 37 on the outside of casing 12. The terminal 37 is connected by line 38 to one terminal 39 of an oscillograph 40, the other terminal of which 41 is connected through line 42 with one terminal of a current source 43. The other terminal of current source 43 is connected to a switch 44 which in its turn is connected by line 45 with line 46 leading to the terminal 29. The line 46 is also connected to one terminal of a current source 47, the other terminal of which is connected to line 48. Branching off from line 46 is a line 49 which comprises a switch 50 and a switch-arm 51. The switch-arm 51 is normally held in open position, for instance, by a spring (not shown) and is moved into closed position by solenoid 52 when the latter is energized. One end of solenoid 52 is connected by line 53 with the terminal 33, whereas the other end of solenoid 52 is connected by line 54 with the line 55. The line 55 comprising a lamp 56 is connected, on one hand, to line 48 and, on the other hand, to a switch-arm 57 which, similar to switch-arm 51, is normally held in open position and moved into closed position by energization of solenoid 58. One end of solenoid 58 is connected by line 59 to the terminal 34, whereas the other end of solenoid 58 is connected by line 60 to line 61. The line 61 likewise comprises a lamp 62 and has one end connected to line 48 whereas the other end leads to switch-arm 63. The switch-arm 63 is similar to switch-arms 51 and 57, normally held in open position, and is closed by energization of solenoid 64. One end of solenoid 64 is connected by line 65 to terminal 35, whereas the other end of solenoid 64 is connected to line 66 which latter comprises a lamp 67 and leads to line 48. Preferably, the switches 44 and 50, and also the lamps 56, 62, and 67 are mounted on a common panel 68.

*Operation of first embodiment*

Figure 6:
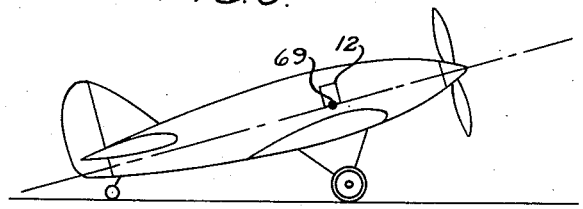
Figure 6 shows the preferable location of my accelerometer in an airplane, while the latter is in flight.

Assuming that the device shown in Figure 2 is to be used for measuring acceleration, for instance, of an airplane. To this end, the device is mounted in an airplane, preferably at its center of gravity as indicated at 69 in Figure 6, in which the base of casing 12 is shown parallel to the thrust line of the airplane. However, it should be noted that also other positions of the instrument, relative to the thrust line of the airplane, are possible, and may even be desirable, without affecting the proper operation of the instrument. If it is desired that the instrument always remain in one and the same position, irrespective of the position of the plane or other device, the acceleration of which is to be measured, the instrument may be suspended in a universal joint or in the manner of a gyro compass. When the instrument has been properly located in the airplane, in accordance with the desired measurements to be effected, and a continuous recording of the measurements is desired, the operator closes the switch 44, thereby establishing a circuit which comprises current source 43, now closed switch 44, lines 45 and 46, terminal 29, contact 28, mercury 24, conductor 36, terminal 37, line 38, oscillograph 40, and line 42.

Supposing now that the ariplane is in flight and encounters an up-gust or positive acceleration, it will be clear from the explanation set forth above under the heading "Principle of the Invention," that the level of the liquid 24, in this instance mercury, rises in arm 26. This shortens the unimmersed length of the conductor or wire 36 thereby reducing the resistance of the circuit so that a higher current flows through the oscillograph. If the airplane runs into a down-gust, thereby encountering a negative acceleration, the situation is of course reversed, i. e. the unimmersed length of the conductor 36 increases and the resistance of the circuit becomes greater. These variations in resistance are continuously recorded by the oscillograph 40 in the same order as they appear and thereby present a picture of the accelerations encountered by the plane.

In this connection, it may be noted that this principle can also be employed without the use of conductor 36. For instance, the conductor 36 could be completely omitted and the tube 14 be made of electric-current-conducting material, such as steel. In this instance, the liquid 24 could be any liquid having a conductivity higher than the material of which the tube 14 is made. The terminal 37 then will be connected to the upper end of the arm 26 of tube 14, while terminal 29 is preferably connected to the lowermost portion of tube 14, which portion corresponds to the location of contact 28 in Figure 2. The contacts 30, 31, and 32 must, of course, be insulated, in this particular instance, in order not to impede their intended function which will be described in detail later.

It will now be clear that, similar to the operation described above, after closure of switch 44, a current will flow from the current source 43 to terminal 29, into the conducting liquid 24, and the surrounding portion of tube 14 up to the liquid level in arm 26, and from there through the remaining tube portion of the arm 26, to terminal 37, and through the oscillograph 40. Since, as is well known, the electrical resistance varies inversely to the cross-sectional area of the conductor, it is obvious that the electrical resistance will decrease when the liquid level in arm 26 rises, and conversely, will increase when the liquid level in arm 26 falls. This variation in resistance is recorded by the oscillograph 40 in a manner similar to that previously described.

If the operator is interested only in the maximum acceleration encountered, he closes the switch 50. When now the level of the mercury in arm 26 rises due to a positive acceleration, so that the mercury reaches contact 30, a current flows from current source 47, through line 46, terminal 29, contact 28, mercury 24, contact 30, terminal 33, line 53, solenoid 52, lines 54 and 55, lamp 56, and through line 48 back to source 47. This current energizes the solenoid 52 so that the latter moves the arm 51 into closed position. This establishes a holding circuit for the lamp 56 which holding circuit comprises source 47, line 49, now closed switch 50, now closed switch 51, solenoid 52, lines 54 and 55, lamp 56, and line 48. In this way, the lamp 56 remains lighted even after the mercury level in arm 26 has resumed its initial position and thereby disengaged the contact 30. In other words, the lamp 56 in its lighted condition indicates that during the measurement the mercury level in arm 26 had reached the contact 30 which corresponds to a definite acceleration.

If the level of the mercury in arm 26 reaches contact 31, a current will flow through solenoid 58 and lamp 62 in a manner similar to that described in connection with the solenoid 52 and lamp 56. Similarly, current will flow through solenoid 64 and lamp 67 when the mercury level in arm 26 reaches contact 32. It will, therefore, be clear that the lighted lamps indicate the various accelerations encountered during the measuring operation, and since each lamp when lighted corresponds to a definite acceleration which may be marked on the panel 68, adjacent the corresponding lamp, the greatest encountered acceleration may immediately be read from the panel. It will, likewise, be clear that the lamps 56, 62 and 67 are lighted successively, thereby giving a visual picture of the change in acceleration as it occurs. When the desired measurement has been made, it is merely necessary to open, and subsequently, to close switch 50 again for conditioning the instrument for a new measurement.

Figure 5:
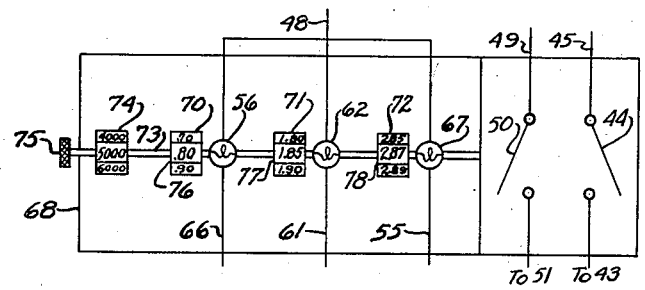
Figure 5 is a mechanism for adapting the readings of the accelerometer to variable altitudes.

In case the measuring instrument, according to the invention, has the liquid 24 in one arm, for instance arm 27, subjected to atmospheric pressure, it will readily be seen that material changes in altitude will affect the calibration of the instrument. In other words, a correction in the calibration will be necessary if the instrument is to be used in materially different altitudes. To take care of this correction, the calibration of the instrument may be made adjustable, for instance as shown in Figure 5. As will be seen therefrom, a plurality of drums 70, 71, and 72 is provided, corresponding in number to the number of possible readings during one and the same set-up of the instrument. (In Figure 2, three possible readings corresponding to the three contacts 30, 31, and 32). The drums 70, 71, and 72 are connected to a common shaft 73 which also carries a drum 74 and is rotatable by a knob 75 which latter is locked in a desired position by any convenient means, such as a locking pin. The drum 74 is provided with markings indicating various altitudes, whereas the drums 70, 71, and 72 are provided with markings indicating various accelerations corresponding to the respective altitudes marked on drum 74. In other words, each altitude marking on drum 74 corresponds to three acceleration markings on drums 70, 71, and 72, respectively. Therefore, if the calibration of the instrument is to be adjusted for a measurement in a changed altitude, it is merely necessary to adjust the drum 74 to the respective altitude; the calibrations pertaining to the said altitude will then become visible through the windows 76, 77 and 78 provided in panel 68.

Figure 4:
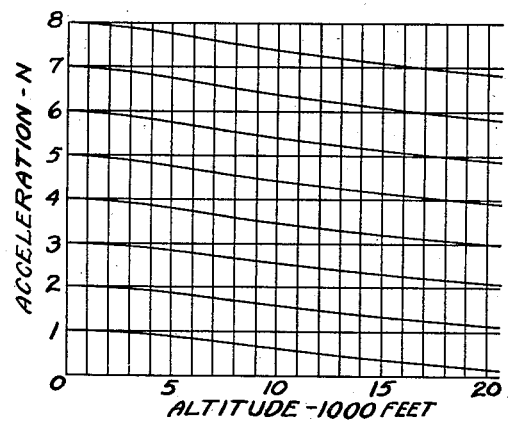
Figure 4 illustrates an altitude correction chart.

Instead of providing the correcting device of Figure 5, use may be made of a correction chart such as shown in Figure 4. This chart has plotted acceleration against altitudes as applied to the respective instruments, thereby indicating the correction to be effected in the calibration of the instrument. For instance, if the instrument shows the acceleration 4g at sea level, it should show, according to the chart of Figure 4, the acceleration 3g at an altitude of 17,000 feet at the lighting-up of one and the same lamp. In other words, one and the same lamp, when lighted, indicates 4g measured at sea level or 3g measured at an altitude of 17,000 feet.

While the instrument, as described so far, is provided with electric means for indicating the effected measurement, it is to be understood that the instrument according to the invention is not limited to such electric means.

Figure 3:
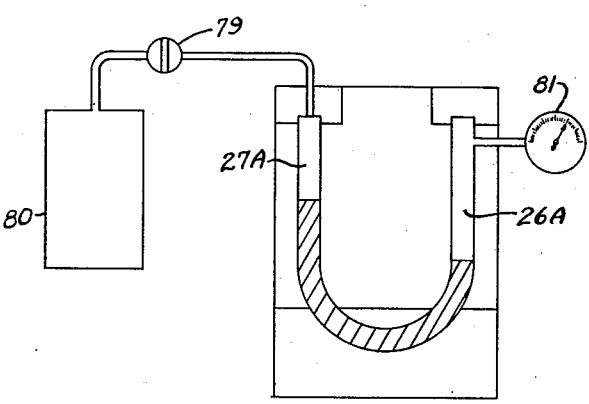
Figure 3 is a second embodiment of my invention.

For instance, fluid pressure responsive means, such as a pressure gage may be used as shown in Figure 3. According to this figure, a gas under a predetermined pressure is entrapped between the end of arm 26A and the adjacent liquid level, while different gas pressure is exerted upon the surface of liquid in arm 27A. This last mentioned pressure is substantially maintained constant during the operation of the device by any desired means, such as a pressure responsive valve 79 in connection with an accumulator 80, whereas, the first mentioned pressure varies during the said operation. Any change in this differential pressure due to acceleration is measured and indicated by the pressure gage 81. The gas in the two arms may be of the same or of different composition.

I want it to be understood that my invention is not limited to the particular construction shown in the drawings but embraces various embodiments as covered by the following claims.

Having described my invention, I claim:

1. In an apparatus for indicating vertical velocity variations, a support subject to vertical velocity variations including a tubular liquid container having an elongated vertically extending portion, a liquid column yieldably supported in said vertically extending portion subject to relative vertical movement thereof incident to said vertical velocity variations, a plurality of signal devices successively operable by said liquid column upon relative vertical movement thereof in one direction in said container to indicate the degree of movement of said liquid, and releasable means for maintaining said signal devices in operative signaling position upon subsequent movement of the liquid column in said container in the opposite direction incident to said vertical velocity variations.

2. In an apparatus for indicating variations in vertical velocities, a support subject to vertical velocity variations including a tubular liquid container having an elongated vertically extending tubular portion, an elongated electrically conductive liquid column yieldably supported in said vertically extending tubular portion with its upper end normally positioned at a predetermined distance from the upper end of said tubular portion, a plurality of electrical contacts insulated from each other extending to the interior of said tubular portion, spaced longitudinally along the tubular portion between the said normal liquid level and the end of said tubular portion for successive electrical contact with said liquid upon relative movement thereof toward said upper end, an operable electric circuit including a signal device connected to each of said electrical contacts at one end and at the other end in contact with said conductive liquid, operable upon relative vertical movement of said liquid column into contact with said contacts to successively actuate said signal devices, magnet switch means in each of said signal circuits, operable upon the energizing of said circuits to maintain said circuits subsequently energized, and switch means common to said circuits for rendering said magnet means inoperative.

WILLIAM W. BENTLEY, Jr.